Figure 1:
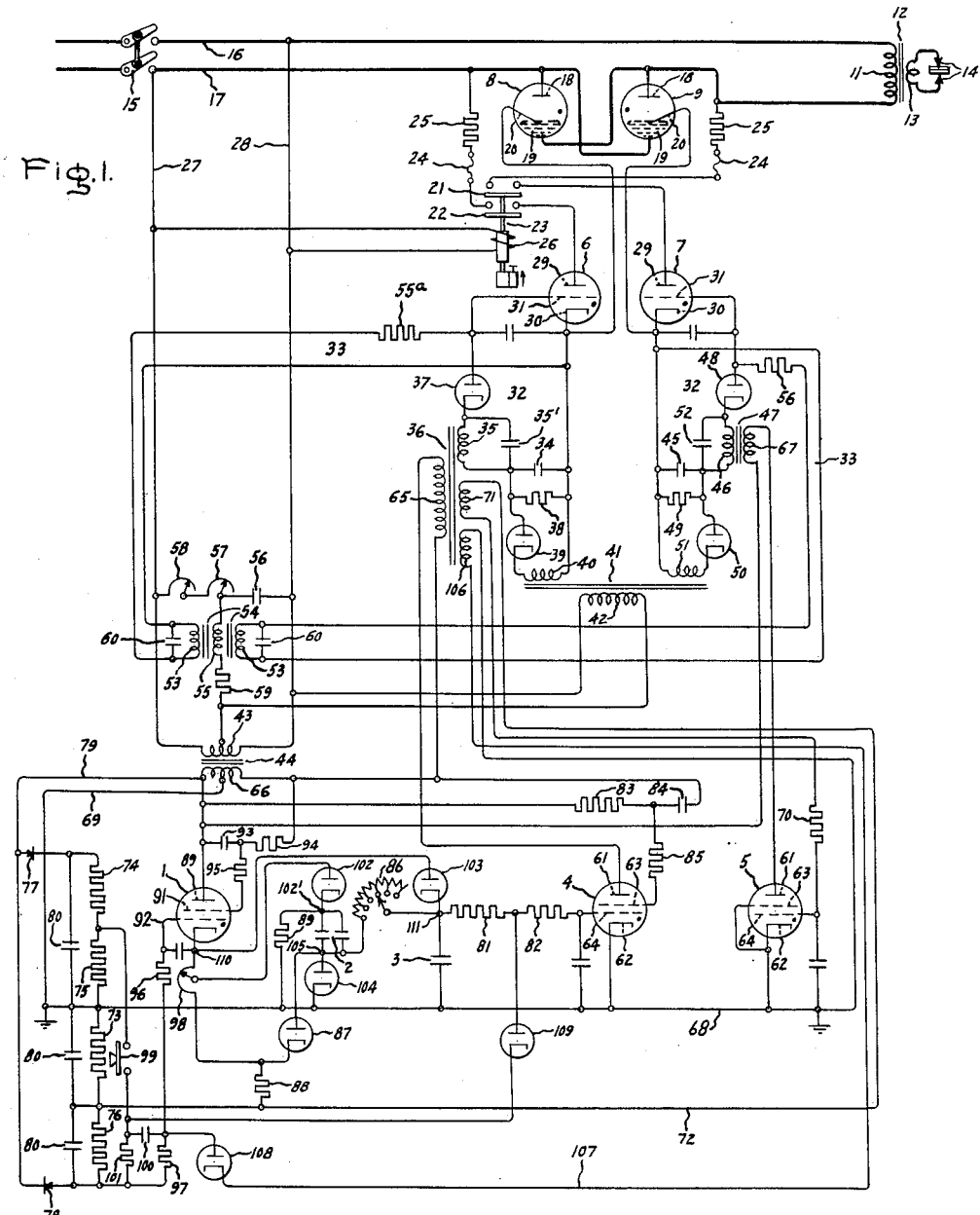

Oct. 2, 1956 — M. E. BIVENS — 2,765,402
ELECTRIC TIMER
Filed Sept. 25, 1952

Inventor:
Maurice E. Bivens,
by Claude S. Mote
His Attorney

United States Patent Office 2,765,402
Patented Oct. 2, 1956

2,765,402

ELECTRIC TIMER

Maurice E. Bivens, Schenectady, N. Y., assignor to General Electric Company, a corporation of New York Application September 25, 1952, Serial No. 311,503

15 Claims. (Cl. 250—27)

My invention relates to electric timers and more particularly to a capacitor type electric timer having an inherent accuracy which is unaffected by gradual variations or abrupt changes in supply line voltages that may occur either between timing periods or during the same timing period.

Certain industrial operations require extreme accuracy in timing. This is particularly true in resistance welding operations where capacitor type timers are extensively used for timing the flow of welding current and for other timing operations which may not be as exacting as is the timing of the flow of welding current. In resistance welding, the current demand is severe and may cause fluctuations in supply line voltage which cannot be eliminated except at great expense. Thus, the operation of a welding machine may produce abrupt voltage changes affecting the timing accuracy of its own unregulated capacitor type timer and the unregulated capacitor type timer of adjacently located machines fed from the same source of supply since such timers are generally sensitive to abrupt changes in their supply voltages. Furthermore, such timers may also be sensitive to gradual variations which may occur in their supply voltages and thus have their timing accuracy impaired.

In capacitor type timers, the charging or discharging of a capacitor through a timing resistance is employed for controlling the conductivity of a timing electric discharge device which in turn controls the timed operation of the device being controlled. The timing electric discharge device usually employed has an anode, a cathode and a control element and its anode-cathode conductivity is controlled by an excitation voltage which is applied between its cathode and control element. These devices have certain critical control voltage characteristics which require the application of excitation voltages of certain values in order to control their anode-cathode conductivity. The critical control voltage characteristics of most types of timing electric discharge devices are slightly negative and vary in a negative sense in accordance with the magnitude of the applied positive anode voltages. Such devices are often considered, however, as having "zero" control element voltage characteristics for the purpose of convenience in explaining their operation.

In some cases, the timing electric discharge device is controlled only by the voltage of a timing capacitor which becomes effective during the extended slowly changing portion of its logarithmic discharge voltage wave. Such operation is not favorable to precise timing and cannot be tolerated when employing electric discharge devices having zero or positive critical control voltage characteristics. For best timing, the timing electric discharge device should operate to terminate the timing period in response to the change in timing capacitor voltage at a time when the timing capacitor voltage is still changing rapidly. Best results are obtained at the time when the timing capacitor has discharged to about 37% of its original voltage or charged to 63% of its final voltage according to the resistance-capacitance time constant, RC, of the timing circuit. This requires a reference voltage usually identified as the control element bias voltage to which the capacitor discharges or charges in order to terminate the timing period. Therefore, the timing electric discharge device operates in response to the relationship of two component control element voltages, namely, to the capacitor timing voltage and the reference or bias voltage. Under service conditions therefore, good timing, that is, stability and repetitive accuracy, depends on maintaining the proper relationship between these two component control element voltages regardless of either abrupt or gradual changes of supply voltage occurring either prior to or during the timing period.

The problem of maintaining the proper relationship between the capacitor voltage and the reference voltage has been solved previously by using auxiliary regulating devices such as constant voltage transformers or voltage regulating tubes in order to regulate the initial charge in the capacitor and to regulate the reference voltage with which the capacitor voltage is compared during the timing operation. Such arrangements are expensive, however, and the use of constant voltage transformers make the timers large, heavy and expensive.

It is an object of my invention to provide an electric timer which maintains its precision without auxiliary regulating means regardless of either abrupt or gradual changes in its control or supply voltage.

It is also an object of my invention to provide an electric timer of simplified construction which provides precise timing and costs but little more than an ordinary timer.

More specifically, it is an object of my invention to provide an electric timer embodying two series connected capacitors which are simultaneously given different electric charges from the same source of supply and which are disconnected from the source of supply during their timing period which is determined by their controlled discharge in a localized circuit including an adjustable resistance.

Further objects of my invention will become apparent from a consideration of the following description of one embodiment thereof shown in the accompanying drawing.

Fig. 1 of this drawing is a diagrammatic representation of my invention as applied in an electric timer for a resistance spot welding control system.

Figure 2:
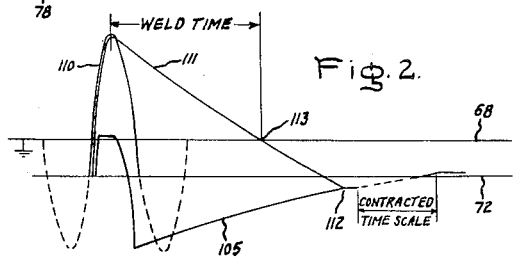

Fig. 2 of this drawing is a graphic representation of certain of the control voltages appearing in the timer part of the system shown in Fig. 1.

The capacitor type timing circuit of my invention has no need for auxiliary regulating devices because a definite percentage of the joint initial timing capacitor voltage is used as a reference voltage and because the time required for a capacitor to discharge to a given percent of its initial voltage is independent of its initial voltage so that the timing circuit is inherently self regulating. This resolves itself into a timing circuit using two capacitors which are initially supplied with dfferent charges from a source of supply and provide a timing capacitance equal to their resultant series capacitance which is disconnected from the source of supply during a timing period for discharge through an adjustable controlling resistor to determine the time interval which is consequently independent of any change in supply voltage which may occur in any manner at any time.

The different capacitor charges used in practicing my invention may be obtained in many ways and capacitors of the same or different capacitance may be employed. Thus, if capacitors of substantially the same capacitance are used they are charged to different voltages in order to obtain the different electric charges which I use. On the other hand, if capacitors of different capacitance are employed they are charged to the same voltage or to substantially the same voltage in order to obtain these desired different electric charges. In either case, and in the other possible variations of relative values of capacitance and charging voltage, the formula $Q=CE$ is controlling so that the different values of Q or electric charge may be obtained by using various values of capacitance C and charging voltage E. I prefer, however, to use capacitors of different capacitance and to charge them to the same or substantially the same voltage and my invention will be described with regard to such an arrangement.

The electric timer shown in the accompanying drawing comprises two capacitors of different capacitance which are connected in series with one another in a localized timing circuit of adjustable resistance value and means for charging these capacitors at the same time with direct current to voltages that are additive to one another in their localized circuit. A timing operation is initiated by simultaneously charging both capacitors from the same voltage source and then simultaneously disconnecting them from this source of voltage and allowing one capacitor to discharge into the other at a controlled rate. The time of discharge is adjustable by adjusting the resistance value of the localized timing circuit in which these capacitors are connected. Since the capacitors receive their unequal charges at the same time and are disconnected from their charging circuit during their timing operation, it is quite apparent that variations in supply voltage have no effect on their timing operation.

In the arrangement illustrated in the accompanying drawing the charging and discharging of the capacitors are controlled by an initiating electric discharge device and a timing electric discharge device, both of which are energized from the same source of alternating current supply with anode voltages that are 180 electrical degrees out of phase with one another. The capacitor of lower capacitance is connected between the control element and cathode of the timing electric discharge device whose anode-cathode conduction initiates a timing operation. When the control system is energized this capacitor and the second capacitor of larger capacitance are charged by a stand-by charging means to voltages which oppose one another in their localized timing circuit and so that the negative terminal of the smaller capacitor presents a hold off voltage to the control element of the timing electric discharge device. A timing operation is started by initiating anode-cathode conduction in the initiating electric discharge device which energizes from the alternating current source of supply an operating charging means which acts on both capacitors at the same time during the same half cycle of the alternating current supply voltage to charge them with different quantities of electricity to polarities that are additive in their localized timing circuit with the smaller capacitor having its polarity reversed so that its now positive terminal is connected to the control element of the timing electric discharge device and thus initiates its anode-cathode conduction. Anode-cathode conduction of this timing electric discharge device applies a control voltage in the control element to cathode circuit of the initiating electric discharge device which prevents it from again becoming conducting during its next positive half cycle of alternating voltage and consequently interrupts the action of the operating charging means to disconnect the capacitors from the alternating current source of supply voltage. The capacitors then begin to discharge through their adjustable resistance discharge path to reach a common negative potential which is applied to the control element of the timing electric discharge device. When the terminal of the smaller capacitor changes its potential from a positive to a negative value, the timing electric discharge device is prevented from again becoming conductive when its anode voltage goes positive and the consequent interruption of control current through its anode-cathode circuit ends the timing operation.

The timing period is substantially independent of the magnitude of the voltages to which the capacitors are charged by the operating charging means from the alternating current supply voltage because a lower or higher charge applied to one of the capacitors is compensated for by a correspondingly lower or higher charge applied to the other capacitor. Changes in the alternating supply voltage during the timing period has no effect on the capacitors since during the timing interval the timing circuit including these capacitors is disconnected from this alternating supply voltage which at most only affects the filament and anode voltages of the timing electric discharge device.

My invention will be better understood from the following complete description of the particular embodiment thereof diagrammatically illustrated in Fig. 1 of the drawing wherein it is employed for timing the flow of welding current in a resistance spot welding control.

A timer embodying my invention is shown at the bottom portion of Fig. 1 of the drawing. It comprises an initiating electric discharge device 1, timing capacitors 2 and 3 and leading and trailing timing electric discharge devices 4 and 5. The time period during which timing electric discharge devices 4 and 5 are conducting is determined by the interaction of the timing capacitors 2 and 3 which will be described in greater detail below.

When timing electric discharge devices 4 and 5 are conducting they introduce control voltages in one portion of the control element to cathode circuits of a pair of firing electric discharge devices 6 and 7 which render these devices conducting beginning in each positive half cycle of their anode voltages in accordance with an adjustable phase shift voltage which is introduced into the other portion of their control element to cathode circuits. When firing electric discharge devices 6 and 7 become conducting, they complete the control element to cathode circuits of a pair of main electric discharge devices 8 and 9 which are reversely connected in parallel with one another between the source of supply 10 and the primary winding 11 of a welding transformer 12 having its secondary winding 13 connected to the welding electrodes 14. These welding electrodes are brought into pressure engagement with the work prior to and during the flow of welding current and are moved out of engagement with the work upon the completion of a welding operation by mechanism forming part of the welding machine.

Since the number of cycles during which the firing electric discharge devices 6 and 7 are conducting is determined by the time during which the timing electric discharge devices 4 and 5 are conducting and since the times in each half cycle of positive anode voltage of firing electric discharge devices 6 and 7 at which these devices become conducting is controlled by an adjustable phase shift voltage applied to their control elements during the timing period, it will be seen that the duration and magnitude of current flow to the welding transformer 12 and welding electrodes 14 are consequently determined by the main electric discharge devices 8 and 9 which are controlled by their firing electric discharge devices 6 and 7.

The system being described is energized by closing a switch 15 which connects supply conductors 16 and 17 with the source of alternating current supply 10. Supply conductor 16 is connected to one terminal of the primary winding 11 of welding transformer 12 and the other supply conductor 17 is connected through main electric discharge devices 8 and 9 to the other terminal of this primary winding 11. The main electric discharge devices 8 and 9 have been illustrated as ignitrons each having an anode 18, a cathode 19 and a control element 20 enclosed in an envelope containing a gas or vapor such as mercury or argon as indicated by the dot associated with the cathodes of these devices to show that they are of the gaseous type. The cathodes 19 of these devices are formed by a pool of mercury into which the ends of the control elements 20 are immersed. These control elements 20 are formed of a suitable high resistance material and the flow of an ignition current between these control elements and their cathodes initiates ionization which results in anode-cathode conduction of these devices.

The control element circuits of main electric discharge devices 8 and 9 are completed through the anode-cathode circuits of firing electric discharge devices 6 and 7, contacts 21 and 22 of a relay 23, fuses 24, current limiting resistors 25 and the primary winding 11 of welding transformer 12 across supply conductors 16 and 17. Relay 23 is a time delay closing relay having its operating winding 26 connected across supply conductors 16 and 17 through conductors 27 and 28. It is employed for disabling the control circuits of main electric discharge devices 8 and 9 until firing electric discharge devices 6 and 7 have had sufficient time for their heated cathodes to arrive at the desired operating temperature.

Firing electric discharge devices 6 and 7 have been illustrated in the drawing as thyratrons each having an anode 29, a cathode 30 and a control element 31 enclosed within an envelope containing a mixture of mercury vapor and argon as indicated by the dots associated with their cathodes to show that they are of the gaseous type. The control-element-to-cathode circuits of these electric discharge devices has the organization disclosed and claimed in my Patent 2,574,373 for Electric Valve Control Circuit granted November 6, 1951, and assigned to the assignee of this invention. Each of these control element circuits has two parallel connected branches 32 and 33 which respectively control the number of half cycles and the time in each half cycle of positive anode voltage at which conduction is initiated in firing electric discharge devices 6 and 7.

The timing branch of the control element circuit for firing electric discharge device 6 extends from its cathode 30 through a capacitor 34, the secondary winding 35 of a transformer 36 and the cathode to anode circuit of a diode 37 to its control element 31. Capacitor 34 has a shunting resistor 38 connected across its terminals and is charged through a half wave rectifier comprising a diode 39 connected in circuit with the secondary winding 40 of a transformer 41 having its primary winding 42 connected across the mid tap and one end terminal of the primary winding 43 of a transformer 44 which is energized from the supply conductors 16 and 17 through conductors 27 and 28. The connections are such that capacitor 34 is charged to present a negative potential toward the control element 31 of firing electric discharge device 6. This bias potential is opposed by the voltage induced in the secondary winding 35 of a transformer 36 when this transformer is energized. The circuit constants are improved by connecting a capacitor 35' across the secondary winding 35 of transformer 36.

The timing branch of the control element circuit for firing electric discharge device 7 has the same organization as that just described for firing electric discharge device 6. It extends from the cathode 30 of firing electric discharge device 7 through a capacitor 45, the secondary winding 46 of a transformer 47 and the cathode to anode circuit of a diode 48 to the control element 31 of this device. Capacitor 45 is bridged by a resistor 49 and is charged through a half wave rectifier comprising a diode 50 and the secondary winding 51 of a transformer winding 40 whose primary 42 is connected as previously described. A capacitor 52 is connected across the secondary winding 46 of transformer 47 to improve the characteristics of its circuit.

The heat control branches of the control element circuits of electric discharge devices 6 and 7 are alike and will be described simultaneously. They extend from cathodes 30 of these devices through the secondary windings 53 of a transformer 54 having a primary winding 55 and through resistors 56 to the control elements 31 of these devices. The primary winding 55 of transformer 54 is in the output circuit of a static phase shift bridge formed by the mid-tapped primary winding 43 of transformer 44 and the parallel connected series circuit including capacitor 55a and adjustable resistances 57 and 58. One end terminal of capacitor 55a is connected to one end terminal of the primary winding 43 of transformer 44 and through conductor 28 to supply conductor 16 and one end terminal of adjustable resistor 58 and the other end terminal of the primary winding 43 of transformer 44 are connected together and through conductor 27 to the other supply conductor 17. The output circuit of this phase shift bridge is connected from the common terminals of capacitor 55a and adjustable resistor 57 through the primary winding 55 of transformer 54 and resistor 59 to the mid tap of the primary winding 43 of transformer 44. This resistor connected in series with primary winding 55 of transformer 54 and capacitors 60 connected across the secondary windings 53 of transformer 54 cooperate to provide a tuning of this output circuit which improves the operation of the phase shift bridge. The output voltages derived from this phase shift circuit determines by the adjustment thereof the points in the positive half cycles of anode voltages at which the firing electric discharge devices 6 and 7 become conducting during the timing period. Adjustable resistor 57 is provided for establishing by its setting the full heat limit of the control, that is the supply of current at the power factor phase angle of the load circuit of the welding transformer. The other adjustable resistor 58 is a heat control resistor whose setting determines the magnitude of current flow within the limits established by the maximum current adjustment of adjustable resistor 57.

The two branches of each of the control element circuits for firing electric discharge devices 6 and 7 cooperate with one another by reason of their interconnection through diodes 37 and 48 to apply to the control elements 31 of these devices the more negative of the voltages in these two branches. Thus, so long as the bias voltages of capacitors 34 and 45 are unopposed by the turn on voltages supplied through the secondary winding 35 of transformer 36 and the secondary winding 46 of transformer 47, these electric discharge devices 6 and 7 are held non-conducting by these negative bias voltages which are applied to their control elements 31. However, when the turn-on voltages induced in the secondary windings 35 and 46 of transformers 36 and 47 are sufficient to overcome these negative bias voltages of capacitors 34 and 45, the firing electric discharge devices 6 and 7 become conducting during their positive half cycles of anode voltages at points determined by the output of the phase shift circuit connected in their heat control branches 33. This, of course, occurs at a time when the diodes 37 and 48 are non-conducting due to the supply of turn on voltages in the timing branches of these control element circuits. When these diodes are conducting, resistances 56 in the heat control branches of the control element circuits of firing electric discharge devices 6 and 7 absorb the difference in voltages between the two branches of the control element circuits and thus present negative voltages to the control elements 31 of the devices 6 and 7.

Turn on voltages are introduced into the timing branches of the control element circuits of firing electric discharge devices 6 and 7 by operation of timing electric discharge devices 4 and 5 of the timing circuit which will now be described.

Timing electric discharge devices 4 and 5 have been illustrated in the drawing as thyratrons each of which has an anode 61, a cathode 62 and control elements 63 and 64 enclosed within envelopes containing gas or vapor such as mercury vapor or argon as indicated by the dots associated with their cathodes to show that they are of the gas filled type. The anodes 61 of these timing electric discharge devices are connected to alternating supply voltages that are 180 electrical degrees out of phase with one another and they are controlled so that device 5 always trails the operation of device 4. Thus the anode 61 of device 4 is connected through the primary winding 65 of transformer 36 in the timing branch of the control element circuit for firing electric discharge 6 to one end terminal of the mid-tapped secondary winding 66 of transformer 44 whose primary 43 forms part of the phase shift circuit previously described and the anode 61 of device 5 extends through the primary winding 67 of transformer 47 in the timing branch of the control element circuit of firing electric discharge device 7 to the other end terminal of the mid-tapped secondary winding 66 of transformer 44. The cathodes 62 of these devices are connected through grounded conductors 68 and 69 to the mid tap of the secondary winding 66 of transformer 44.

One of the control elements 63 of device 5 is connected to its cathode 62 and the other control element 64 thereof is connected through a current limiting resistor 70, the secondary winding 71 of transformer 36, a conductor 72, a resistor 73 and a conductor 68 to the cathode 62 thereof. Resistor 73 and resistors 74, 75 and 76 form part of a potentiometer or voltage divider which is energized through rectifiers 77 and 78 and conductors 79 and 69 from the left hand half of the secondary winding 66 of transformer 44. Smoothing capacitors 80 are connected across the terminals of these resistors. The voltage drop across resistor 73 of the potentiometer just described applies a negative bias voltage to the control element 64 of timing electric discharge device 5 and consequently holds this device non-conducting. However, when timing electric discharge device 4 conducts and thus energizes the primary winding 65 of transformer 36, a turn on voltage is introduced into its secondary winding 71 which opposes this bias voltage and causes timing electric discharge device 5 to become conducting when its anode goes positive. Thus, when timing electric discharge device 4 becomes conducting during a positive half cycle of its anode voltage, which for convenience will be referred to as a positive half cycle of the supply voltage, timing electric discharge device 5 becomes conducting during the next or negative half cycle of the supply voltage when its anode 61 is at a positive potential, due to the control voltage applied thereto as a result of the prior conduction of timing electric discharge device 4. Consequently, timing electric discharge device 5 will always operate in trailing response to prior conduction of timing electric discharge device 4.

One of the timing capacitors 3 of the timing circuit is connected across the control element 64 and cathode 62 of timing electric discharge device 4 through current limiting resistors 81 and 82 and conductor 68. The other control element 63 of this timing electric discharge device is connected through a phase shift circuit across the terminals of the secondary winding 66 of transformer 44. This phase shift circuit includes a resistor 83 and a capacitor 84 connected in series with one another across the terminals of the secondary winding 66 of transformer 44 and control element 63 of timing electric discharge device 4 is connected through a current limiting resistor 85 to the common terminals of resistor 83 and capacitor 84 of this phase shift circuit. This phase shift circuit is so adjusted and connected that control element 63 of timing electric discharge device 4 is excited to permit initiation of anode-cathode conduction of device 4 only during the first few degrees of a half cycle of its positive anode voltage. Thus, subject to the control imposed by its other control element 64, timing electric discharge device 4 can only become conducting during the initial portion of a positive half cycle of its anode voltage.

Ofter supply switch 15 has been closed to energize the control system and during stand by, timing capacitors 2 and 3 are charged by reason of their connection across conductors 68 and 72 which are energized by the voltage across resistor 73 of the potentiometer 74, 75, 73, 76. The charging circuit for capacitor 3 extends from conductor 68 through an adjustable tapped resistor 86, the anode-cathode circuit of a diode 87 and a resistor 88 to conductor 72. Capacitor 2 is charged through a circuit which extends from conductor 68 through a resistor 89, the anode-cathode circuit of diode 87 and resistor 88 to conductor 72. Timing capacitors 2 and 3 are connected in a localized timing circuit having the adjustable resistance value of adjustable tapped resistor 86. The circuit extends from one terminal of capacitor 3 through capacitor 3, adjustable resistor 86, capacitor 2, resistor 89, and conductor 68 back to the previously mentioned one terminal of capacitor 3. Adjustable resistor 86 constitutes the timing adjustment and is dominant in the capacitor discharge circuit since fixed resistor 89 is comparatively of a very low value. The charging connections for capacitors 2 and 3 during standby apply voltages to these capacitors which are in opposition to one another in their localized circuit and so that the negative terminal of capacitor 3 is connected toward the control element 64 of timing electric discharge device 4. Consequently this device is held non-conducting at this time.

The timer is set into action by rendering initiating electric discharge device 1 conducting. This device has been illustrated as a thyratron having an anode 89, a cathode 90 and two control elements 91 and 92 all of which are enclosed in an envelope containing a gas or vapor such as mercury or argon as indicated by the dot associated with its cathode to show that it is of the gaseous type. Control element 91 of initiating electric discharge device 1 is connected to a phase shift circuit including a series connected capacitor 93 and resistor 94 energized from the end terminals of the secondary winding 66 of transformer 44. The control element 91 of initiating electric discharge device 1 is connected through a current limiting resistor 95 to the common terminals of the capacitors 93 and 94 of this phase shift circuit. The arrangement is such that initiating electric discharge device 1 can start conducting only during the first part of a positive half cycle of its anode voltage, subject however to the control imposed by its other control element 92. This other control element 92 is connected through a current limiting resistor 96 and a resistor 97 to one terminal of element 76 of potentiometers 74, 75, 73, 76 and the other terminal of resistor 76 is connected through resistor 88 and adjustable potentiometer 98 to the cathode 90 of initiating electric discharge device 1. Consequently, initiating electric discharge device 1 is held non-conducting by reason of the negative bias voltage applied to its control element 92 by the voltage appearing across element 76 of the potentiometer. Initiating electric discharge device 1 may be rendered conducting, however, by closure of a pushbutton switch 99. When this switch is closed a positive voltage relative to the cathode 90 of device 1 is applied to its control element 92 through capacitor 100. This control voltage is effective for two or three cycles of the supply line voltage during the period that capacitor 100 is charging up in response to the voltage drop across resistor 101 which is obtained by closure of pushbutton switch 99 connecting it across elements 75, 73 and 76 of potentiometer 74, 75, 73, 76.

When initiating electric discharge device 1 becomes conducting, it completes the operating charging circuit for timing capacitors 2 and 3 through rectifiers 102 and 103. These capacitors 2 and 3 are thus connected across the end terminal and mid terminal of the secondary winding 66 of transformer 44 and and are consequently charged simultaneously by the same voltage with different quantities of direct current. Capacitor 3 is charged through a circuit extending from the left end terminal of the secondary winding 66 of transformer 44 through the anode-cathode circuit of initiating electric discharge device 1, the anode-cathode circuit of rectifier 103, capacitor 3 and conductors 68 and 69 to mid terminal of secondary winding 66 of transformer 44. The charging circuit for timing capacitor 2 extends from the same end terminal of the secondary winding 66 of transformer 44 through the anode-cathode circuit of initiating electric discharge device 1, the anode-cathode circuit of rectifier 102, capacitor 2, the anode-cathode circuit of rectifier 104 and conductors 68 and 69 to the same mid terminal of the secondary winding 66 of transformer 44.

During the first half of the positive half cycle of anode voltage applied to the initiating electric discharge device 1, capacitor 3 is charged to the positive crest voltage thereof. Capacitor 2 is likewise charged by this same voltage through rectifier 104. During the remaining half of this half cycle of charging voltage, the voltage drop across resistor 89 decreases substantially to zero leaving terminal 102' of capacitor 2 at substantially ground potential. Since capacitor 2 was charged during the first half of the half cycle of charging voltage, terminal 105 of capacitor 2 will therefore during the second half of this half cycle shift negative by the amount of the change in voltage at terminal 102' thereof. This voltage relationship is shown in Fig. 2 where the voltage curves have been identified by reference numerals used in Fig. 1. Thus 110 of Fig. 2 is the potential of terminal 110 of cathode resistors 88 and 98, 111 is the potential of terminal 111 of capacitor 3, 105 is the potential of terminal 105 of capacitor 2, and 72 and 68 are respectively the potentials of conductors 72 and 68. Adjustable potentiometer 98 by its adjustment will however determine the relative magnitude of the voltages across capacitors 2 and 3.

As a result of the charging operation just described, capacitors 2 and 3 are supplied with unequal charges having voltages which are additive in their localized timing circuit and so that the now positive terminal of capacitor 3 is connected to control element 64 of timing electric discharge device 4. Consequently, this device becomes conducting when the anode voltage of initiating electric discharge device 1 is negative, because the anode voltages of devices 1 and 4 are 180 electrical degrees out of phase. Conductivity of timing electric discharge device 4 energizes the primary winding 65 of transformer 36 and applies a voltage in the secondary winding 106 of this transformer which is applied to control element 92 of initiating electric discharge device 1 to prevent this device from again becoming conducting when its anode voltage again goes positive. The secondary winding 106 of transformer 36 is connected across capacitor 100 through the following circuit: From one terminal of capacitor 100 through pushbutton switch 99, resistor 75, conductor 68, the secondary winding 106 of transformer 26, conductor 107, and rectifier 108 to the other terminal of capacitor 100. This immediately charges capacitor 100 so that its terminal connected to control element 92 of initiating electric discharge device 1 is at a negative potential relative to its cathode 90 by the voltage of winding 106 which is more negative than the voltage appearing across element 76 of potentiometer 74, 75, 73, 76.

Thereafter, capacitor 3 which initially supplies positive control element voltage for timing electric discharge device 4, discharges through timing resistor 86 and fixed resistor 89 into capacitor 2 and because capacitor 2 has a larger charge than capacitor 3 these capacitors eventually arrive at the common negative potential 112 of Fig. 2. Timing electric discharge device 4 is conducting for a period terminated when terminal 111 of capacitor 3 goes negative at point 113 in Fig. 2. It is apparent by reference to Fig. 2 that the timing by the discharge of capacitors 2 and 3 is a function of the ratio of voltages applied to them by the adjustment of potentiometer 98 during their charging through initiating electric discharge device 1 as well as the value of timing resistance 86 connected in their discharge circuit. Therefore, for a given value of resistor 86 and a given ratio of charging voltages as determined by potentiometer 98, the timing is independent of the supply voltage employed for charging them. Furthermore during timing the component voltages in the resistor-capacitor timing circuit are entirely disassociated from the control supply voltage and consequently supply voltage changes of any kind occurring during the timing period have no effect on the timing. Usually potentiometer 98 will provide a factory calibration to take care of variation in circuit components and adjustable resistor 86 will be employed by the operator to obtain various time setting as required for the welding operations being performed.

If the control is not used for a considerable length of time, the capacitors would eventually lose their charge due to leakage and electric discharge device 4 would become conducting except for the connection through rectifier 87 which prevents the capacitors from discharging to a potential less negative than the potential of conductor 72 which is negative by the amount of the voltage across element 73 of potentiometer 74, 75, 73, 76.

A connection from control element 64 of leading timing electric discharge device 4 is completed through resistor 82 and diode 109 to potentiometer 74, 75, 73, 76 for applying a negative control voltage thereto should the operator during operation of the system release the pushbutton 99. This is the so-called "beat" control required by certain specifications. Each of the electric discharge devices 6, 7, 1, 4 and 5 have transient suppressing capacitors connected between their control elements and cathodes as has been illustrated in the drawing. The heating circuits for the cathodes of these devices as well as for the cathodes of rectifier 37, 48, 39, 50, 102, 103, 104, 87 and 108 have not been illustrated in the drawing in order to simplify it. It will be understood that these heating circuits are connected to the source of supply and means such as the relay 22 above described may also be provided for disabling electric discharge devices 1, 4 and 5 until their cathodes have obtained a suitable operating temperature.

The features and advantages of an electric timer embodying my invention will be better understood from a consideration of the overall operation of the illustrated system of Fig. 1 of the drawing of which it forms a part, together with a reconsideration of the voltage relationships in this timer which have been illustrated in Fig. 2 of the drawing.

The system is energized by closing line switch 15 which connects supply conductors 16 and 17 to the source of alternating current supply 10. This energizes the heating circuits, not shown, for the various cathodes of the various hot cathode devices illustrated in the drawing. It also energizes the operating winding 26 of relay 23 which after a predetermined time delay closes its contacts 21, 22 to complete the firing circuits for main electric discharge devices 8 and 9. It also energizes the primary winding 42 of transformer 41 and the primary winding 43 of transformer 44. Transformer 41 energizes through the half wave rectifiers associated therewith capacitors 34 and 45 of the timing branches of the control element circuits of electric discharge devices 6 and 7 to apply negative bias voltages to their control elements 31. Electric discharge devices 8, 6 and 4 are poled to conduct by reason of their connections when supply conductor 17 is at positive potential which for convenience will hereinafter be referred to as in response to positive half cycles of the supply voltage. Electric discharge devices 9, 7, 1, and 5 are poled to conduct by reason of their connections during negative half cycles of the supply voltage, that is when supply conductor 16 is at positive potential.

Timing capacitors 2 and 3, during standby, are charged by the potential provided across conductors 68 and 72 by potentiometer 74, 75, 73, 76 which is energized through rectifiers 77 and 78 from the supply conductors 16 and 17 through transformer 44. These capacitors are charged to voltages that oppose one another in their localized circuit and so that the negative terminal of capacitor 3 is connected toward control element 64 of timing electric discharge device 4 thus holding this device non-conducting. Capacitor 3 is charged to the voltage across conductors 68 and 72 through a circuit including the adjustable tapped resistor 86, rectifier 87 and resistor 88 and capacitor 2 is charged to this same voltage through resistor 89, rectifier 87 and resistor 88. At this time initiating electric discharge device 1 is held non-conducting by the negative bias voltage applied to its control element 92 by reason of the voltage appearing across element 76 of potentiometer 74, 75, 73, 76.

A welding operation is initiated by closing pushbutton switch 99. This applies to control element 92 of initiating electric discharge device 1 through capacitor 100 a control potential which is positive relative to its cathode. The circuit for applying this potential extends from control element 92 of device 1 through its current limiting resistor 96, capacitor 100, contacts of pushbutton switch 99, potentiometer elements 75 and 73, resistor 88, and adjustable potentiometer 98 to its cathode 90. Initiating electric discharge device 1 may not become immediately conducting however due to the restraint imposed by its other control element 91 which is connected to the phase shift circuit 93, 94 so as to permit conduction beginning only during the first part of a positive half cycle of its anode voltage within a time not exceeding one cycle and at the beginning of a negative half cycle of supply voltage when the anode 89 of initiating electric discharge device 1 is at positive potential electric discharge device 1 will become conducting and complete the operating charging circuit for timing capacitors 2 and 3.

When initiating electric discharge device 1 becomes conducting at the beginning of its positive anode voltage which occurs during a negative half cycle of the supply voltage, capacitor 3 is charged through a circuit extending from the left end terminal of secondary winding 66 of transformer 44 through the anode-cathode circuit of initiating electric discharge device 1, rectifier 103 and conductors 68 and 69 to the mid terminal of this secondary winding 66. At the same time, capacitor 2 is charged through a circuit which extends from the same end terminal of secondary winding 66 of transformer 44 through the anode-cathode circuit of initiating electric discharge device 1, adjustable potentiometer 98, rectifiers 102 and 104, and conductors 68 and 69 to the same mid terminal of this secondary 66. During the first half of the half cycle charging period terminal 111 of capacitor 3 and terminal 102' of capacitor 2 are elevated to the full positive crest value thereof, disregarding of course voltage drops in the discharge devices and the setting of potentiometer 98.

Capacitors 2 and 3 are charged through rectifiers 102 and 103 to voltages which are additive to one another in their localized circuit with terminal 111 of capacitor 3 being at positive voltage which is applied to control element 64 of timing electric discharge device 4. Consequently, this device is free to conduct at the beginning of a positive half cycle of the alternating supply voltage when its anode 61 is at positive polarity. This restraint for conduction only at the beginning of a positive half cycle of its anode voltage is imposed by the voltage applied to its other control element 63 through phase shift circuit 83 and 84. As soon as timing electric discharge device 4 conducts, it energizes the primary winding 65 of transformer 36 and thus energizes the secondary windings 35, 71 and 106 of this transformer.

The energization of secondary winding 106 of transformer 36 completes a charging circuit for capacitor 100 through rectifier 108 as follows: From the upper terminal of the secondary winding 106 through conductor 68, voltage element 75 of potentiometer 74, 75, 73, 76, the contacts of pushbutton switch 99, capacitor 100 and rectifier 108 to the lower terminal of this secondary winding 106. This promptly charges capacitor 100 and applies a negative bias voltage to control element 92 of initiating electric discharge device 1 which prevents it from again becoming conducting when its anode voltage again arrives at a positive value. When initiating electric discharge device 1 is thus held non-conducting, the operating charging circuit for capacitors 2 and 3 is disconnected from the alternating current source of supply and capacitors 2 and 3 are permitted to discharge into one another during the timing period without being sensitive in any way to variations in the alternating current supply voltage.

The voltage induced in the secondary winding 71 of transformer 36 upon the energization of its primary 35 applies a control voltage to control element 64 of timing electric discharge device 5 which renders it conducting in trailing response to the operation of timing electric discharge device 4. Thus each time timing electric discharge device 4 is energized during a positive half cycle of the supply voltage, timing electric discharge device 5 will be energized during the next half cycle when the alternating current supply voltage reverses.

The energization of secondary winding 35 of transformer 36 upon energization of the primary winding 65 thereof applies a turn on voltage in the timing branch of the control element circuit of firing electric discharge device 6 which opposes the bias voltage of capacitor 34 in that portion of the circuit and thus frees the other branch or heat control branch of the control element circuit of firing electric discharge device 6 for operation. Firing electric discharge device 6 thus becomes conducting at a time in its positive half cycle of anode voltage determined by the phase shift setting of the phase shift circuit, which in turn depends upon the adjustment of adjustable resistor 58 thereof. As previously stated, firing electric discharge device 6 becomes conducting when its anode potential is at positive polarity during a positive half cycle of the alternating supply voltage and firing electric discharge device 7 becomes conducting when its anode potential is positive during a negative half cycle of the alternating supply voltage. At this time conduction of timing electric discharge device 5 energizes the primary winding 67 of transformer 47 which has its secondary winding 46 connected in the timing branch 32 of the control element circuit of firing electric discharge device 7. The voltage thus induced in secondary winding 46 opposes the bias voltage of capacitor 45 and transfers control to the control branch 33 of this control element circuit for initiating conduction of firing electric discharge device 7 in accordance with the phase shift setting of the phase shift circuit as previously described above in connection with the operation of firing electric discharge device 6.

When firing electric discharge device 6 becomes conducting it completes the control element to cathode circuit of main electric discharge device 8 from supply conductor 17 through resistor 25, fuse 24, the contacts 22 of relay 23, the anode-cathode circuit of firing electric discharge device 6, control element 20 and cathode 19 of main electric discharge device 8 and the primary winding 11 of the welding transformer to the other supply conductor 16. This initiates conduction in main electric discharge device 8 which becomes conductive immediately after the firing electric discharge device 6 becomes conducting. During a negative half cycle of the supply voltage, firing electric discharge device 7 and its main electric discharge device 9 become conducting in the same manner just described for electric discharge devices 6 and 8. Sequential conduction of main electric discharge devices 8 and 9 applies a full cycle of supply voltage to the primary winding 11 of welding transformer 12. This operation continues so long as timing electric discharge devices 4 and 5 are conducting.

When terminal 111 of capacitor 3 decreases to zero voltage it terminates the timing period because timing electric discharge device 4 cannot again become conducting when its anode again becomes positive assuming of course that it has a zero voltage characteristic. Actually, however, device 4 may have a negative control characteristic which becomes more negative with higher anode voltages and this would cause device 4 to phase back during the later conduction half cycles of a long timing period if it were not for the fact that device 4 can initiate a conduction period only at the beginning of its positive half cycle of anode voltage because of the phase shift voltage applied to its control element 63. Thereafter, timing electric discharge device 4 is held non-conducting by the build up of negative voltage across capacitor 3 which is presented to its control element 64 by reason of its connection therewith. This condition prevails until pushbutton switch 99 is opened whereupon the capacitor 100 will discharge through resistors 97 and 101 and again condition the circuit for another operation upon reclosure of pushbutton switch 99. If during a welding operation pushbutton switch 99 is opened, a connection completed through rectifier 109 applies a negative bias voltage to control element 64 of timing electric discharge device 4 which renders this device non-conducting and thus interrupts the operation of the system and discontinues the flow of welding current.

It will thus be seen that when the weld time is initiated, capacitor 3 for positive control element timing voltage and capacitor 2 for negative control element bias and timing reference are charged with different quantities of electricity from the same charging voltage impulse during the same half cycle of the alternating current supply. Capacitor 3 discharges to zero voltage during a time interval largely independent of the magnitude of the initiating charging voltage because a lower or higher charge applied to capacitor 3 is compensated for by a corresponding lower or higher charge applied to capacitor 2. During the timing interval, the timing circuit is disconnected from the control voltage which only affects the filament and anode voltages of the timing discharge devices 4 and 5.

My invention is not limited to the particular embodiment thereof which has just been described. Thus, as pointed out in the introductory portion of this specification, the timing capacitors need not be of unequal capacitance so long as means are provided for giving them different charges. The formula $Q=CE$ is controlling so that different values of $Q$ may be obtained by using various values of capacitance $C$ and charging voltage $E$. Arrangement for accomplishing this result are equivalent to the embodiment above described and of course are within the scope of my invention. Furthermore, my capacitor timer is not limited in its application to resistance spot welding controls such as illustrated in the drawing. It may be used for any application which requires a precision timing operation that is accurate and independent of gradual or abrupt changes in supply voltage which may occur at any time prior to or during the timing period.

It is of course also apparent that various modifications and changes may be made in the embodiment of my invention illustrated in the drawing without departing from my invention. Thus, for example a high resistance of from 10 to 60 megohms may be substituted for the protective rectifier 87 in order to counteract leakage resistance. It is also not necessary to use the beat circuit connection including rectifier 109. Other arrangements may also be provided for securing the desired sequence of operations for charging the timing capacitors 2 and 3 from the alternating current source of supply during the same half cycle thereof, and for thereafter disconnecting these timing capacitors during their timing operation from the alternating current source of supply. Also, the voltage change across either of the capacitors 2 and 3 may be employed for a control operation. Other types of electric discharge devices and diodes may be employed respectively for ignitrons 8 and 9 and thyratrons 1, 4 and 5 and for the hot cathode rectifiers above described.

Therefore, while I have shown and described a particular embodiment of my invention it will be obvious to those skilled in the art that variations and modifications thereof may be made without departing from my invention in its broader aspects and I therefore aim in the appended claims to cover all such changes and modifications as fall within the true spirit and scope of my invention.

What I claim as new and desire to secure by Letters Patent of the United States is:

1. Timing apparatus comprising first and second capacitors and means for supplying charging voltages thereto, the relationship of values of the capacitances of said capacitors and of the values of said charging voltages being such that said capacitors may be charged with different quantities of electricity, means for connecting said capacitors in a localized timing circuit of adjustable resistance value, means for charging said capacitors at the same time from said voltage supply means with different quantities of direct current electricity to voltages that are additive to one another in said localized circuit, means for energizing and deenergizing said last-mentioned means, and means for initiating a control operation in response to a voltage value across the terminals of one of said capacitors within the range of voltage change resulting from the timed discharge through said localized timing circuit of adjustable resistance value of said second capacitor into said first capacitor upon deenergization of said charging means.

2. Timing apparatus comprising first and second capacitors and means for supplying charging voltages thereto, the relationship of values of the capacitances of said capacitors and of the values of said charging voltages being such that said capacitors may be charged with different quantities of electricity, a localized timing circuit including said capacitors and an adjustable resistor connected in series relationship, means for charging said capacitors at the same time from said voltage supply means with different quantities of direct current electricity to voltages that are additive to one another in said localized timing circuit, means for energizing and deenergizing said charging means to initiate the discharge of said capacitors, and means responsive to the reversal of voltage across said first capacitor resulting from the timed discharge through said localized timing circuit of said second capacitor into said first capacitor at a time subsequent to the deenergization of said charging means for effecting a control operation.

3. Timing apparatus comprising first and second capacitors and means for supplying charging voltages thereto, the relationship of values of the capacitances of said capacitors and of the values of said charging voltages being such that said capacitors may be charged with different quantities of electricity, means for charging said capacitors at the same time from said voltage supply means with different quantities of direct current electricity, a localized closed timing circuit in which said capacitors and an adjustable resistor are connected in series relationship and in which capacitor terminals of unlike polarity are connected toward one another so that upon interruption of the operation of said charging means said second capacitor discharges into said first capacitor at a rate controlled by said adjustable resistor and produce a voltage change across each of said capacitors, means for interrupting the operation of said charging means, and control conductors connected to be responsive to a first value of the voltage across one of said capacitors for initiating a control operation and to a second value of voltage across one of said capacitors resulting from the timed discharge of one of said capacitors into the other for terminating said control operation.

4. Timing apparatus comprising first and second capacitors and means for supplying charging voltages thereto, the relationship of values of the capacitances of said capacitors and of the values of said charging voltages being such that said capacitors may be charged with different quantities of electricity, means for charging said capacitors at the same time from said voltage supply means with different quantities of direct current electricity, means including an adjustable resistor for completing an electric timing circuit between said capacitors in which capacitor terminals of unlike polarity are connected toward one another so that upon interruption of the operation of said charging means said second capacitor discharges at a rate controlled by said adjustable resistor into said second capacitor and produce a voltage change across each of said capacitors, means for interrupting the operation of said charging means to initiate a timing operation, a device, and means responsive to a voltage change across the terminals of one of said capacitors as a result of the timed discharge of said second capacitor into said first capacitor for operating said device at a time subsequent to the operation of said means for interrupting the operation of said charging means.

5. Timing apparatus comprising a first capacitor, a second capacitor of greater capacitance than said first capacitor, means providing a fixed connection of said capacitors in a localized timing circuit of adjustable resistance value, means for charging said capacitors at the same time with direct current to voltages that are additive to one another in said localized timing circuit, means for energizing and deenergizing said last-mentioned means to initiate the discharge of said capacitors, and means for initiating a control operation in response to a voltage value across the terminals of one of said capacitors attained a predetermined interval of time after the deenergization of said charging means as a result of the timed discharge through said localized circuit of adjustable resistance value of said second capacitor into said first capacitor upon deenergization of said charging means.

6. Timing apparatus comprising a first capacitor, a second capacitor of greater capacitance than said first capacitor, means providing a fixed connection of said capacitors in a localized timing circuit of adjustable resistance value, means for charging said capacitors at the same time with direct current to voltages that are additive to one another in said localized timing circuit, means for energizing and deenergizing said charging means to initiate the discharge of said capacitors, and means responsive to the reversal of voltage across said first capacitor a predetermined interval of time subsequent to the deenergization of said charging means determined by the rate of discharge of said capacitors for initiating a control operation.

7. Timing apparatus comprising a pair of supply conductors, a first capacitor, a second capacitor of greater capacitance than said first capacitor, means for charging said capacitors with direct current at the same time from said pair of supply conductors, means including an adjustable resistor for completing an electric timing circuit between said capacitors in which capacitor terminals of unlike polarity are connected toward one another so that upon interruption of the operation of said charging means said second capacitor discharges into said first capacitor at a rate controlled by said adjustable resistor to produce a voltage change across each of said capacitors, means for interrupting the operation of said charging means to initiate the discharge of said capacitors, and control conductors connected to be responsive to the voltage across one of said capacitors attained a predetermined interval of time after the interruption of said charging means as a result of the timed discharge of said capacitors.

8. Timing apparatus comprising a pair of supply conductors, a first capacitor, a second capacitor of greater capacitance than said first capacitor, means for charging said capacitors with direct current at the same time from said pair of supply conductors, means including an adjustable resistor for completing an electric circuit between said capacitors in which capacitor terminals of unlike polarity are connected toward one another so that upon interruption of the operation of said charging means said second capacitor discharges at a rate controlled by said adjustable resistor into said first capacitor to produce a voltage change across each of said capacitors, means for interrupting the operation of said charging means to initiate a timing operation, a device, and means responsive to a voltage attained across the terminals of one of said capacitors as a result of the discharge of said second capacitor into said first capacitor for operating said device at a time subsequent to the operation of said means for interrupting the operation of said charging means.

9. Timing apparatus comprising a first capacitor, a second capacitor having a greater capacitance than said first capacitor, means providing a fixed connection of said capacitors in a local circuit of adjustable resistance value, alternating current supply conductors, rectifier means for simultaneously charging said capacitors from said supply conductors, means for energizing said rectifier means with substantially full half cycles of alternating current voltage from said supply conductors, means responsive to the polarity to which said first capacitor is charged by said rectifier means for initiating a timing operation and at the same time for deenergizing said rectifier means, and means for terminating said timing operation in response to the reversal of polarity across said first capacitor by discharge of said second capacitor into said first capacitor upon deenergization of said rectifier means.

10. Timing apparatus comprising a first capacitor, a second capacitor of greater capacitance than said first capacitor, means providing a fixed connection of said capacitors in a localized circuit of adjustable resistance value, means controlled in accordance with the time required for a change from one polarity to the other polarity of a terminal of said first capacitor, stand-by means for charging said capacitors with direct current to voltages that are in opposition to one another in said localized circuit with said terminal of said first capacitor being at a potential of said other polarity relative to its other terminal, operating means for charging said capacitors at the same time with direct current to voltages that are additive to one another in said localized circuit with said terminal of said first capacitor being at a potential of said one polarity relative to its other terminal, means for energizing said operating charging means, and means responsive to the change in polarity of said terminal of said first capacitor upon charging by said operating charging means, for deenergizing said operating charging means and thus initiating the discharge of said second capacitor into said first capacitor for again changing the polarity of said first capacitor after a time delay period determined by said adjustable resistance value of said localized circuit for said capacitors.

11. Timing apparatus comprising a first capacitor, a second capacitor of greater capacitance than said first capacitor, means for providing a fixed connection of said capacitors in a localized circuit of adjustable resistance value, initiating and control electric discharge devices each having an anode, a cathode and two control elements, pairs of alternating current supply conductors having voltages 180 electrical degrees out of phase with one another, means for connecting the anode-cathode circuits of said electric discharge devices across said alternating current supply conductors with their anode voltages 180 electrical degrees out of phase with one another, means for applying in the control element circuits of one of the control elements of each of said electric discharge devices voltages of said alternating current supply conductors which release said electric discharge devices for conduction only at the beginning of a positive half cycle of their anode voltages subject to the restraint of their said other control elements, means for connecting one terminal of said first capacitor to the cathode of said control electric discharge device and the other terminal thereof to said other control element of said control electric discharge device, stand-by means for charging said capacitors to voltages that are in opposition to one another in said localized circuit with the terminal of said first capacitor which is connected to said other control element of said control electric discharge device being at negative polarity, means for applying a voltage to said other control element of said initiating electric discharge device which initiates conduction of said electric discharge device subject to the restraint of its said other control element, rectifier means connected through the anode-cathode circuit of said initiating electric discharge device across a pair of said alternating current supply conductors for charging said capacitors at the same time with direct current to voltages that are additive to one another in said localized circuit with the terminal of said first capacitor which is connected to said other control element of said control electric discharge device being at positive polarity, and means responsive to the flow of current in the anode-cathode circuit of said control electric discharge device for applying in the control element circuit of said other control element of said initiating discharge device a voltage which prevents said initiating electric discharge device from again becoming conducting and thus initiates discharging of said second capacitor into said first capacitor.

13. Timing apparatus comprising an initiating electric discharge device and a control electric discharge device each having an anode, a cathode and two control elements, first and second alternating current supply conductors having voltages 180 electrical degrees out of phase with one another relative to a third alternating supply conductor, a direct current conductor having a voltage which is negative relative to said third alternating current supply conductor, means for connecting the anode of said initiating electric discharge device to said first alternating current supply conductor and its cathode through a resistor to said direct current conductor, means for applying in the control element circuits of one of the control elements of each of said electric discharge devices alternating voltages of said supply conductors which release said electric discharge devices for conduction only at the beginning of a positive half cycle of their anode voltages subject to the control provided by the supply of excitation to their said other control elements, means for applying a voltage in the control element circuit of said other control element of said initiating electric discharge device a voltage which initiates conduction of said electric discharge device subject to the restraint of its said other control element, a first capacitor, a second capacitor having a greater capacitance than said first capacitor, means for connecting one terminal of said first capacitor to said third alternating current supply conductor and its other terminal through an adjustable resistor to one terminal of said second capacitor and through said cathode resistor of said initiating electric discharge device to said direct current conductor, means for connecting said other terminal of said second capacitor through a resistor to said third alternating current supply conductor and said one terminal thereof to the anode of a voltage limiting rectifier having its cathode connected to said third alternating current supply conductor, a pair of capacitor charging rectifiers each having it anode connected between the cathode and said cathode resistor of said initiating electric discharge device and each having its cathode connected to a different one of said other terminals of said capacitors, means including a loading circuit for connecting the anode of said control electric discharge device to said second alternating current supply conductor and its cathode to said third alternating current supply conductor, means for connecting the other control element of said control electric discharge device to said other terminal of said first capacitor, and means responsive to the flow of current in the anode-cathode circuit of said control electric discharge device for applying in the control element circuit of said other control element of said initiating electric discharge device a voltage which prevents said initiating electric discharge device from again becoming conductive.

12. Timing apparatus comprising an initiating electric discharge device and a control electric discharge device each having an anode, a cathode and two control elements, first and second alternating current supply conductors having voltages 180 electrical degrees out of phase with one another relative to a third alternating current supply conductor, a direct current conductor having a voltage which is negative relative to said third alternating current supply conductor, means for connecting the anode of said initiating electric discharge device to said first alternating current supply conductor and its cathode through a resistor to said direct current conductor, means for applying in the control element circuits of one of the control elements of each of said electric discharge devices alternating voltages of said supply conductors which release said electric discharge devices for conduction only at the beginning of a positive half cycle of their anode voltages subject to the control provided by the supply of excitation to their said other control elements, means for applying a voltage in the control element circuit of said other control element of said initiating electric discharge device a voltage which initiates conduction of said electric discharge device subject to the restraint of its said other control element, a first capacitor, a second capacitor having a greater capacitance than said first capacitor, means for connecting one terminal of said first capacitor to said third alternating current supply conductor and its other terminal through an adjustable resistor to one terminal of said second capacitor and to the anode of a protective rectifier whose cathode is connected through said cathode resistor of said initiating electric discharge device to said direct current conductor, means for connecting said other terminal of said second capacitor through a resistor to said third alternating current supply conductor and said one terminal thereof to the anode of a voltage limiting rectifier having its cathode connected to said third alternating current supply conductor, a pair of capacitor charging rectifiers each having its anode connected between the cathode and said cathode resistor of said initiating electric discharge device and each having its cathode connected to a different one of said other terminals of said capacitors, means including a loading circuit for connecting the anode of said control electric discharge device to said second alternating current supply conductor and its cathode to said third alternating current supply conductor, means for connecting the other control element of said control electric discharge device to said other terminal of said first capacitor through a current limiting resistor, and means responsive to the flow of current in the anode-cathode circuit of said control electric discharge device for applying in the control element circuit of said other control element of said initiating electric discharge device a voltage which pre- 14. Timing apparatus comprising a pair of supply conductors, a first timing capacitor, a second timing capacitor of substantially greater capacitance than said first capacitor, means for simultaneously charging said capacitors from said supply conductors, means comprising an adjustable resistor for completing an electric timing circuit consisting of said capacitors and resistor connected in series relationship with capacitor terminals of unlike polarity connected toward each other to provide for discharge of one of said capacitors into the other at a rate controlled by said resistor in response to interruption of the charging of said capacitors, means for simultaneously interrupting the charging of said capacitors to effect simultaneous initiation of the discharge thereof, and control conductors connected to be responsive to the value of voltage across one of said capacitors attained a predetermined interval of time after the interruption of said charging means.

15. Timing apparatus comprising first and second timing capacitors and means for supplying charging voltages thereto, the relationship of values of the capacitances of said capacitors and of the values of said charging voltages being such that said capacitors may be charged with different quantities of electricity, means for connecting said capacitors in a localized timing circuit of adjustable resistance value, means for simultaneously charging said capacitors from said voltage supply means with different quantities of electricity to voltages that are additive to one another in said localized circuit, means for energizing said charging means to connect both said timing capacitors to said source and for deenergizing said charging means to disconnect both said capacitors from said source to effect simultaneous initiation of discharge of both said capacitors, and means for initiating a control operation in response to a voltage value across the terminals of one of said capacitors within the range of voltage change resulting from the timed discharge through said localized timing circuit of said first capacitor into said second capacitor upon deenergization of said charging means.

References Cited in the file of this patent

UNITED STATES PATENTS

| | | |
|---|---|---|
| 1,907,279 | Blomberg | May 2, 1933 |
| 2,024,838 | Stansbury | Dec. 17, 1935 |
| 2,233,810 | Dawson | Mar. 4, 1941 |
| 2,357,652 | Haynes | Sept. 5, 1944 |
| 2,409,583 | Perkins | Oct. 15, 1946 |
| 2,607,907 | Marshall | Aug. 19, 1952 |
| 2,658,141 | Kurland et al. | Nov. 3, 1953 |